(No Model.)
L. RUSSELL.
STOVE PIPE THIMBLE.
No. 294,811. Patented Mar. 11, 1884.
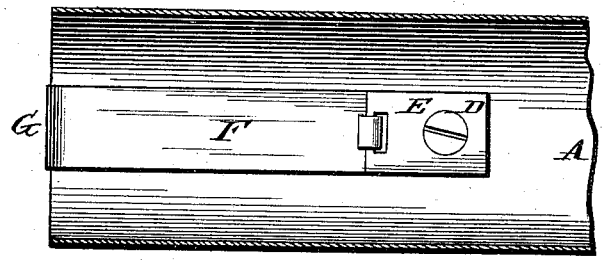
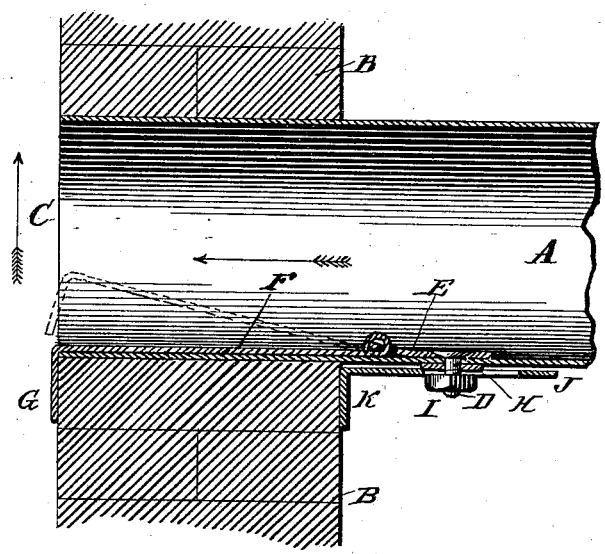
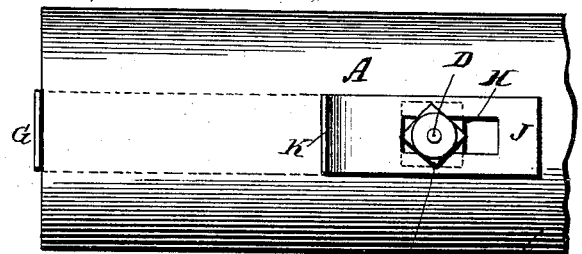
WITNESSES:
Fred. G. Dieterich.
Arthur L. Morsell.
Luther Russell
INVENTOR.
By Louis Bagger & Co.
ATTORNEYS.

UNITED STATES PATENT OFFICE.

LUTHER RUSSELL, OF EVART, MICHIGAN.

STOVE-PIPE THIMBLE.

SPECIFICATION forming part of Letters Patent No. 294,811, dated March 11, 1884.

Application filed July 6, 1883. (No model.)

*To all whom it may concern:*

Be it known that I, LUTHER RUSSELL, a citizen of the United States, and a resident of Evart, in the county of Osceola and State of Michigan, have invented certain new and useful Improvements in Stove-Pipe Fasteners; and I do hereby declare that the following is a full, clear, and exact description of the invention, which will enable others skilled in the art to which it appertains to make and use the same, reference being had to the accompanying drawings, which form a part of this specification, and in which—

Figure 1 is a top view of a section of a stove-pipe, partly broken away to show the construction and arrangement of the locking device. Fig. 2 is a longitudinal sectional view of the pipe with its locking device, and Fig. 3 is a bottom view.

Similar letters of reference indicate corresponding parts in all the figures.

My invention has relation to devices for fastening or locking that part of a stove-pipe which is inserted into the flue-orifice in the chimney to the wall of the chimney, so as to prevent it both from being accidentally withdrawn therefrom and from being pushed too far into the flue; and it consists, in the combination, with the stove-pipe, or with that section of the stove-pipe which projects into the chimney, of the peculiarly-constructed locking device which will be hereinafter more fully described and claimed.

In the accompanying drawings, A is the stove-pipe; B, the chimney, and C the orifice in the wall of the chimney into which the stove-pipe is inserted. Fastened inside of the pipe by a screw, D, is a plate, E, in one end of which is hinged the latch, F, the projecting outer end of which is bent down at right angles to form the hook G. The screw D is inserted through the under side of the stove-pipe, and is provided with a washer, H, and nut I. Clamped between the washer and the nut is a plate, J, one end of which is bent down at right angles to form the downward-projecting lip or hook K. By loosening nut I it will be seen that the slotted plate J K may be moved forward or back in the direction of its length upon the screw D, upon which it may be locked in its adjusted position by tightening down the nut I.

From the foregoing description, taken in connection with Fig. 2 of the drawings, the operation of this device will readily be understood. After the stove-pipe has been inserted into the chimney, the hinged latch-hook F G will drop down against the inner side of the chimney-orifice C, thus preventing the pipe from being drawn out. Next, plate J K is adjusted by loosening the nut I, so as to bear or bind with its hooked end K against the outside of the chimney, when it is fastened in this position by tightening down the nut; and it will be seen that the pipe is firmly locked in place in the chimney, so that it can be drawn neither forward nor back until plate J K is again loosened and the latch F G released from the inside of the chimney by lifting its free end up into the pipe, as indicated by the dotted lines in Fig. 2.

Having thus described my invention, I claim and desire to secure by Letters Patent of the United States—

The combination, with a stove-pipe, of the locking or fastening device consisting of the plate E, hinged latch F G, screw D, slotted plate J K, washer H, and nut I, constructed and combined to operate substantially in the manner and for the purpose herein shown and set forth.

In testimony that I claim the foregoing as my own I have hereunto affixed my signature in presence of two witnesses.

LUTHER RUSSELL.

Witnesses:
CHAS. W. BALL,
A. J. SHERIDAN.